United States Patent

Osteen

[15] 3,695,009
[45] Oct. 3, 1972

[54] AIR FILTER DEVICE
[72] Inventor: Mitchell M. Osteen, Rte. 1, Zirconia, N.C. 28739
[22] Filed: March 30, 1970
[21] Appl. No.: 23,912

[52] U.S. Cl. ...................55/385, 55/387, 55/504, 55/524, 240/25, 240/47
[51] Int. Cl. .............................................B01d 50/00
[58] Field of Search.........55/385, 387, 490, 494, 512, 55/514, 516, 517, 518, 519, 524, 510; 240/25, 47; 210/263, 283, 287

[56] References Cited

UNITED STATES PATENTS

| | | | |
|---|---|---|---|
| 3,457,399 | 7/1969 | Milroy | 240/47 X |
| 2,389,435 | 11/1945 | Karlström | 55/514 |
| 2,553,763 | 5/1951 | Hammon | 55/518 X |
| 3,377,480 | 4/1968 | Robertson | 240/47 |
| 1,506,216 | 8/1924 | Benner | 55/518 X |
| 3,352,423 | 11/1967 | Osterman | 210/497 X |
| 2,583,812 | 1/1952 | Briggs et al. | 55/524 UX |
| 3,458,977 | 8/1969 | Young et al. | 55/514 X |
| 1,412,748 | 4/1922 | McKay | 339/120 X |
| 3,272,978 | 9/1963 | Jackson | 240/52 X |
| 3,118,619 | 1/1964 | Harling | 240/52 X |
| 2,548,168 | 4/1951 | Luce | 55/387 X |
| 2,614,650 | 10/1952 | Chandler et al. | 55/387 X |

FOREIGN PATENTS OR APPLICATIONS

| | | | |
|---|---|---|---|
| 674,562 | 9/1933 | Germany | 55/DIG. 33 |

*Primary Examiner*—Frank W. Lutter
*Assistant Examiner*—Vincent Gifford
*Attorney*—Sidney Greenberg, J. Wesley Haubner, Frank L. Neuhauser, Oscar B. Waddell and Joseph Forman

[57] ABSTRACT

An air-purifying filter device for a sealed optical enclosure of a luminaire comprises a coherent mass of activated charcoal particles contained in a rigid holder and having a plurality of recesses in its surface to increase the filter surface area, lower its air flow resistance, and reduce the amount of contaminant deposit thereon. The filter device is arranged in an enclosure formed by separable connecting parts of the luminaire in communication with the sealed optical enclosure.

3 Claims, 4 Drawing Figures

Inventor,
Mitchell M. Osteen,
by Sidney Greenberg
His Attorney.

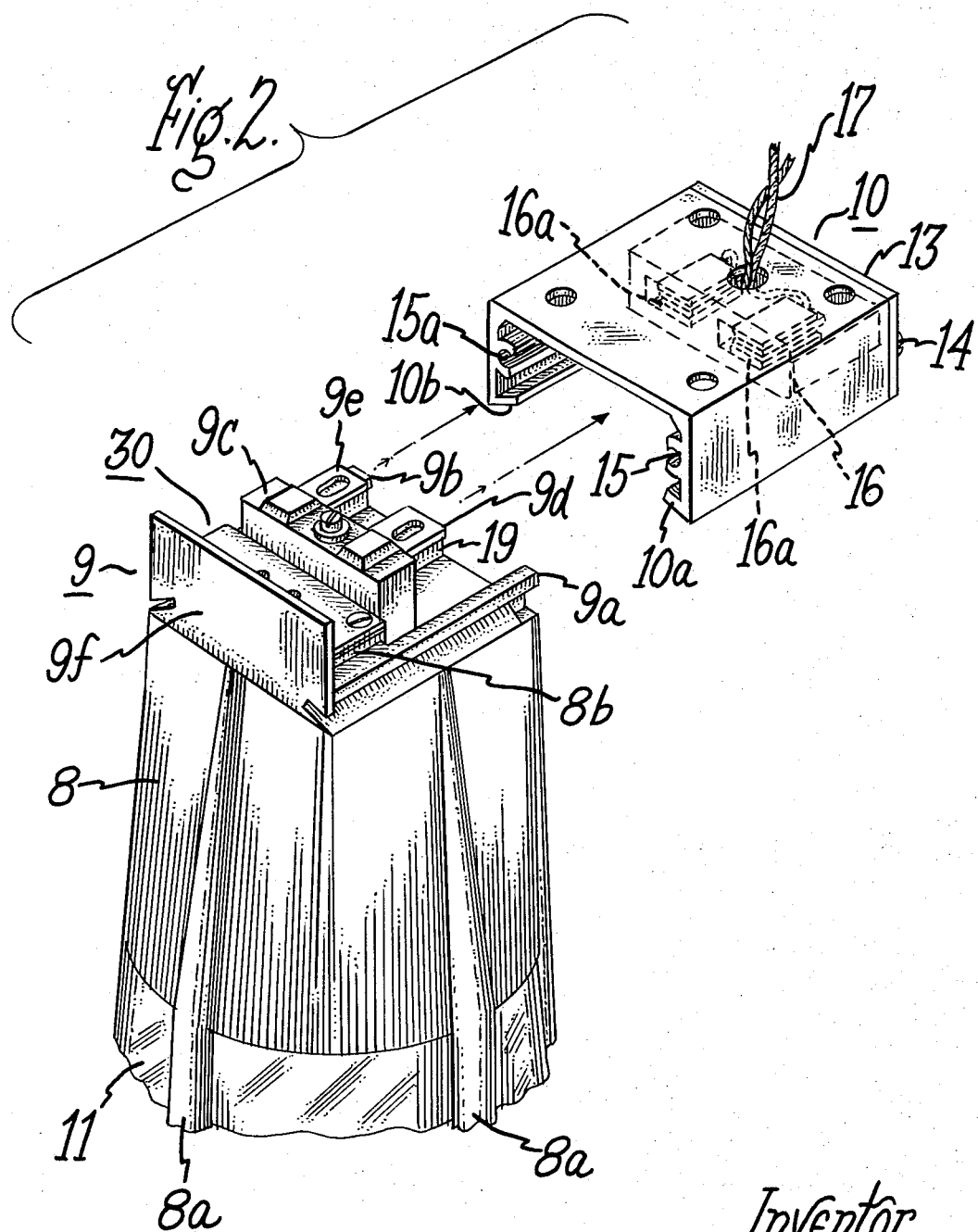

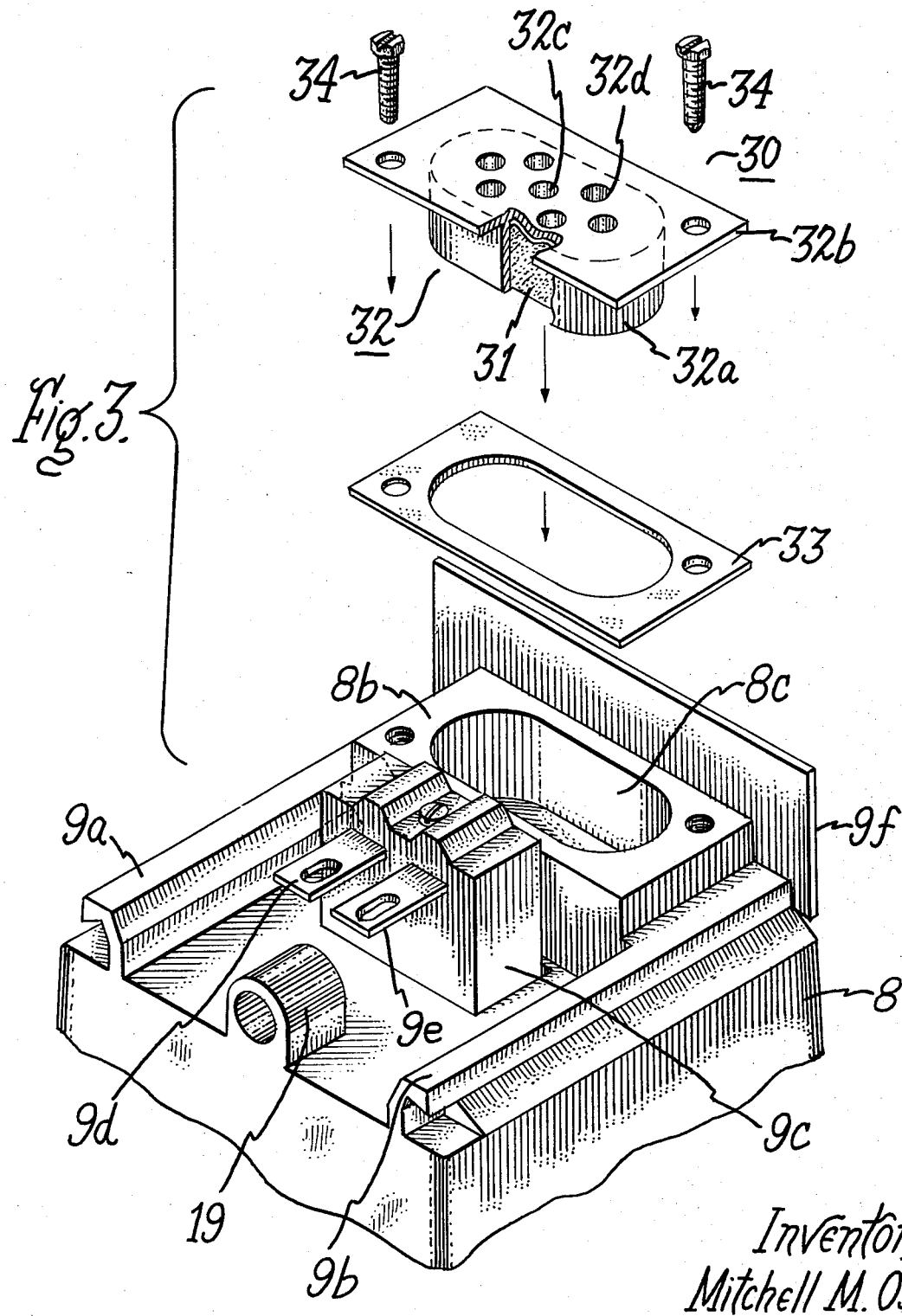

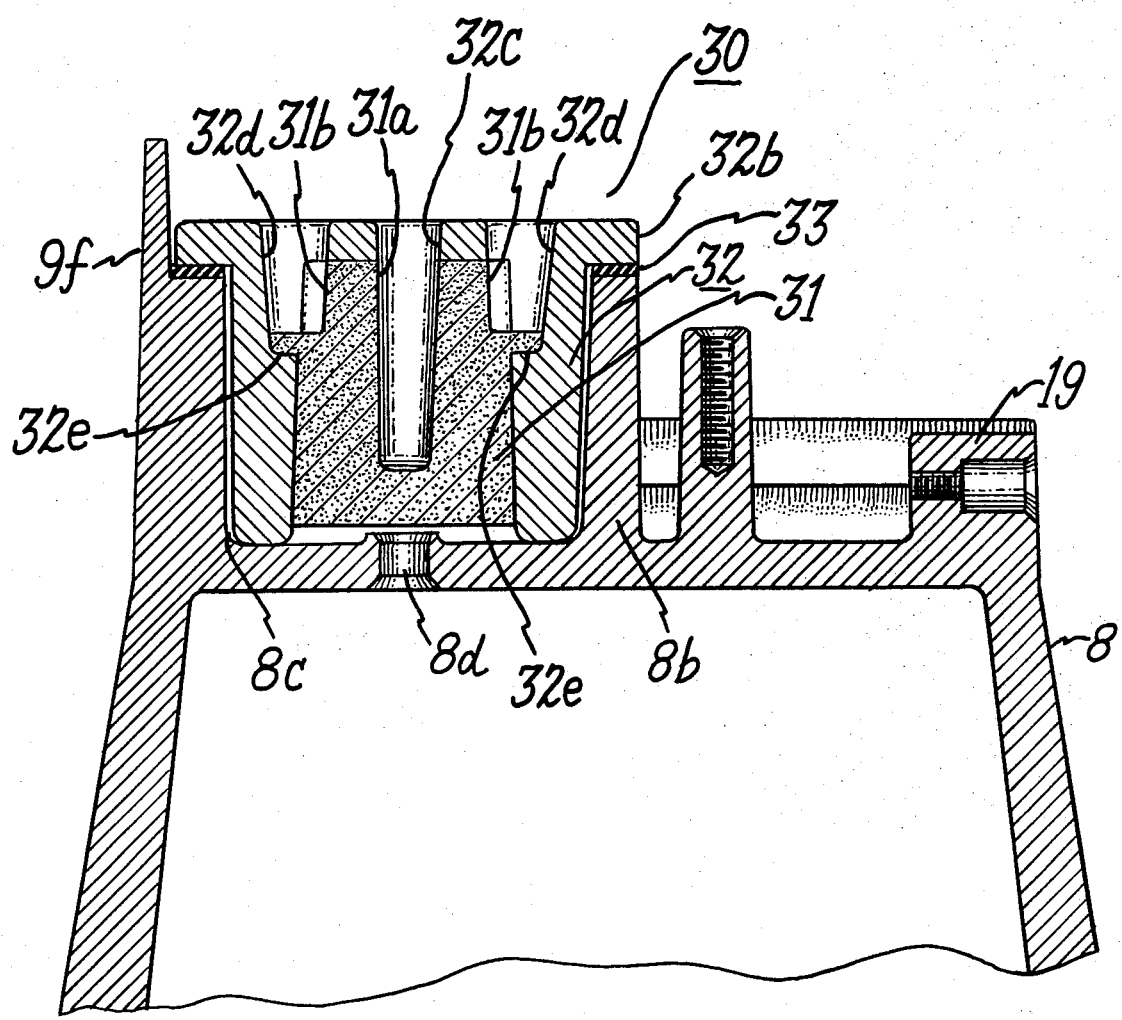

AIR FILTER DEVICE

The present invention relates to air filters and particularly concerns an improved air filter device for use in luminaires having sealed optical systems protected from the entry of contaminating materials in the atmosphere.

It is an object of the present invention to provide an improved air-permeable filter device for purifying the air entering sealed luminaire optical systems, whereby a high level of illumination may be obtained from the luminaire over a prolonged period.

It is a particular object of the invention to provide an air filter device of the above type which has reduced resistance to air flow therethrough during its operating life, is mechanically strong and withstands rough handling, has increased filtering surface area, and is relatively easy to manufacture and assemble in proper position in a luminaire.

It is another object of the invention to provide an improved arrangement of an air filter of the above type in a luminaire where in the filter device is shielded from direct exposure to dust and the high temperature and radiation of the luminaire lamp.

Other objects and advantages will become apparent from the following description and the appended claims.

With the above objects in view, the present invention in one of its aspects relates to a filter device comprising tubular holder means having openings at opposite ends, and a mass of filter material contained in and held by the holder means and having opposite surfaces through which air may pass for purification by the filter material, the mass of filter material being formed with recess means extending a substantial distance partially into the mass of filter material. In a preferred embodiment of the invention, the described air filter device is used in combination with a luminaire optical assembly comprising a housing, a reflector and a light transmitting closure means secured together in sealed relation forming a closed optical enclosure, the optical assembly being separably connected to a supporting means and forming a second enclosure therewith at the connecting region, the filter device being arranged in the second enclosure in communication with the interior of the closed optical enclosure and with its recessed surface exposed to the incoming air flow for filtering the same.

The invention will be better understood from the following description taken in conjunction with the accompanying drawings, in which:

FIG. 2 is an exploded view in perspective of the slidable connecting device of the FIG. 1 luminaire incorporating an air filter in accordance with the invention;

FIG. 3 is an exploded view of the air filter arrangement in the FIG. 2 luminaire connecting device; and FIG. 4 is a cross-sectional view of the assembly of the air filter device with the luminaire socket housing.

Figure 1:
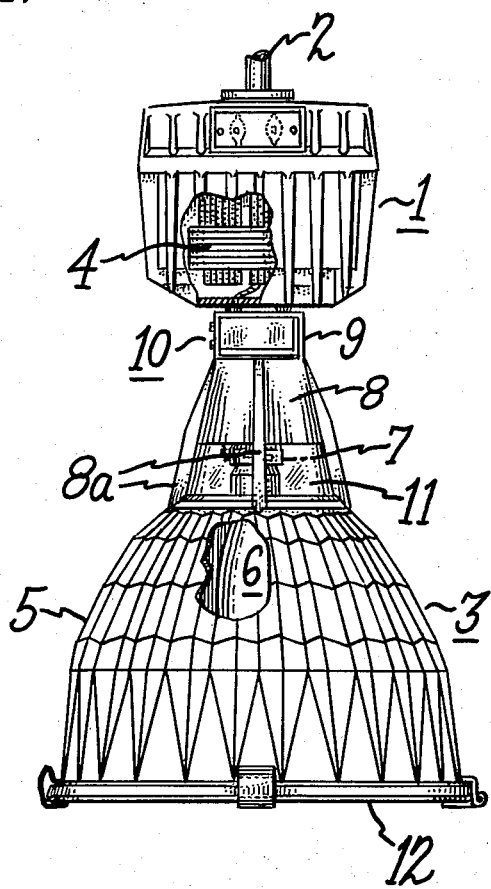
FIG. 1 is a view in elevation, partly broken away, of a luminaire of industrial type in which the invention may be embodied.

Referring now to the drawings, and particularly to FIG. 1, there is shown an industrial luminaire comprising a ballast housing 1 secured to a wire conduit 2 such as a metal pipe and having an optical assembly 3 suspended from the bottom thereof. Contained is a transformer 4 and other electrical operating components (not shown) for operating the light source of the luminaire. Optical assembly 3 is detachably secured to ballast housing 1 by means of a quick disconnect device comprising co-acting support members 9 and 10 which, when assembled as shown, provide an enclosure for the electrical and mechanical connecting structure and the air filter device of the invention, as shown in FIGS. 2 and 3. The structure and arrangement of connecting members 9, 10 are more fully disclosed in co-pending application, Ser. No. 882,886, Osteen et al., filed Dec. 8, 1969 and assigned to the same assignee as the present invention. Optical assembly 3 includes a faceted reflector 5 in which is mounted lamp 6, typically of high intensity gaseous discharge type such as a mercury vapor lamp, removably secured to a lampholder or socket 7 so as to extend downwardly therefrom into reflector 5. Lampholder 7 is secured within socket housing 8 which is joined to the top of reflector 5 by spaced legs 8a defining circumferentially spaced openings which are closed by an annular transparent window 11 to permit light from lamp 6 to pass upwardly out of the luminaire. The mouth of reflector 5 is closed by a hinged transparent door glass 12. Upper window 11 is suitably sealed, e.g., by resilient gaskets (not shown), at its top to socket housing 8 and at its bottom to reflector 5, and door glass 12 when closed is similarly sealed to the bottom rim of reflector 5 to provide an air-tight enclosure within optical assembly 3. Such an arrangement is shown in U.S. Pat. No. 3,457,399, Milroy wherein is also disclosed a luminaire air filter device and arrangement on which the present invention is an improvement.

As seen in FIG. 2, the quick disconnect device of the luminaire by which optical assembly 3 is suspended from the bottom of ballast housing 1 comprises slidably inter-engageable support members 9 and 10, of which member 10 is fixed to the bottom of ballast housing 1 and member 9 is formed at the top of socket housing 8.

Hanger 10 is an inverted channel-shaped member secured by suitable means to the bottom wall of ballast housing 1 and formed along its lower edges with spaced parallel flanges 10a and 10b. The rear end of member 10 is closed by plate 13 secured by screws 14 which engage elongated bosses 15, 15a of C-shaped cross-section formed along the inner surfaces of the sides of member 10. Secured to the top wall of member 10 adjacent cover plate 13 is an electrical receptacle 16 comprising an insulated socket housing having a pair of spaced sockets in which are located electrical contacts 16a suitably connected by lead wires 17 to the electrical operating components in ballast housing 1.

Complementary connecting device 9 at the top of optical assembly 3 is formed with spaced parallel flanges or runners 9a, 9b formed to engage over and slide along hanger flanges 10a, 10b of hanger member 10. When connecting device 9 is slid completely into the latter member, optical assembly 3 hangs from hanger 10. At the rear end of connecting device 9 is a vertical plate 9f which closes the open end of channel member 10 when connecting device 9 is fully slid into the latter, thereby forming a complete housing enclosure for the interconnected parts. In this assembled position, connector 9 is fastened to hanger member 10 by a screw or other suitable means engaging boss 19 for locking the two parts together.

Mounted on the surface of member 9 between flanges 9a, 9b is an electrical plug 9c having spaced electrical contact prongs 9e, 9d which fit into the spaced sockets of electrical receptacle 16 and engage the resilient contact members 16a therein, so that when member 9 is fully slid into channel member 10, electrical connection between the parts is automatically made. Suitable lead wires (not shown) connect contact prongs 9e, 9d to lampholder 7.

Luminaires of the described type are particularly applicable for indoor use in industrial environments such as manufacturing plants and factories. In such areas, the atmospheres often contain various types of contaminants particularly of gaseous nature which tend to adversely affect the optical and illuminating system of the luminaire, and in the usual installation ready cleaning of the luminaire is difficult to accomplish due to the relatively inaccessible location of such luminaires.

In accordance with the invention, an improved filter arrangement is provided for such luminaires. In the illustrated embodiment, filter device 30 is arranged in the space between vertical plate 9f and electrical plug 9c at the top of socket housing 8 (see FIGS. 2 and 3). As seen best in FIG. 3, the top of socket housing 8 is integrally formed with a box-like receptacle 8b having an opening 8c in which filter device 30 is received and having an aperture 8d at its bottom (see FIG. 4) whereby opening 8c communicates with the interior of socket housing 8 and the sealed optical enclosure. Filter device 30 comprises an air-permeable mass of filter material 31. Typically, the filter material is a bonded coherent mass of activated charcoal particles through which the air passes and which serves to remove therefrom, by adsorption, contaminants not only of particulate type but also of gaseous type, such as found in industrial fumes, smog, exhaust products from internal combustion engines such as hydrocarbons, and the like. In accordance with a feature of the invention, filter mass 31 is contained and held in a rigid housing 32 which is preferably of metal, such as aluminum, but may also be made of a hard plastic material such as a phenolic resin. In the illustrated embodiment, filter holder or housing 32 comprises a tubular portion 32a open at its bottom and filled with filter material, and a flat apertured plate 32b extending across the top of tubular portion 32a. The latter portion has a shape complementary to the opening 8c in receptacle 8b so as to fit loosely therein, and in the assembly, plate 32b rests on the rim of receptacle 8b and is suitably secured thereto in sealing relation by screws 34 or the like with a resilient gasket 33 interposed therebetween. With the parts in assembled condition, filter device 30 is enclosed by connecting structure 9, 10 and is thereby protected from direct exposure to dust, heat and harmful radiation from the lamp, while operating as the sole passageway for air into and out of the optical assembly.

In accordance with another feature of the invention, filter mass 31 is formed with a plurality of spaced recesses 31a (see FIG. 4) extending a substantial distance from its top surface partially into its interior, and apertures 32c of top plate 32b are arranged in register with the openings of recesses 31a and are respectively substantially co-extensive therewith to enable entry of air through filter holder 32 into filter mass 31. As will be seen in FIG. 4, recesses 31a extend more than halfway between the opposite surfaces of filter mass 32. The provision of such elongated recesses 31a in the described arrangement results in a considerably larger breathing surface of the filter mass 31 with minimum exposure to the outside environment. The recesses further act as settling chambers for entering dirt particles, and even if the filter device is oriented in various positions only a relatively small portion of the filer surface area is subject to contaminant deposits. It is accordingly evident that the provision of the filter recesses as described not only decreases the initial resistance to air flow through the filter, but also considerably enhances the probability of continued low air flow resistance for a prolonged period of luminaire operating life.

A cross-sectional view of the filter device 30 in assembly with socket housing 8 is shown in FIG. 4, the lampholder and associated parts in socket housing 8 being omitted for the sake of clarity. As there seen, the bottom surface of filter mass 31 is spaced somewhat from the bottom of receptacle 8b to permit unimpeded air flow between filter 31 and aperture 8d in the top of socket housing 8. A series of elongated recesses 31a spaced along the central portion of filter mass 31 and aligned with corresponding apertures 32c of plate 32b extend downwardly into the interior of the filter mass, while recesses 31b at the margins of filter mass 31 in register with apertures 32d of plate 32b extend to a lesser distance into filter mass 31 and serve a similar function as recesses 31a, as described above. Apertures 32d of the filter plate are so formed as to provide a stepped or ledge portion 32e at the bottom of each aperture 32d projecting inwardly into the interior of holder 32, and as more fully described below, filter mass 31 is so introduced into the filter holder as to overlie the ledge portions 32e to interlock the filter mass with the holder. In addition, filter mass 31 is adhesively bonded to the inner surfaces of tubular holder 32.

In a suitable procedure for making a filter device such as described, activated charcoal in granular form having a particle size within U.S. sieve sizes 20 to 50 is thoroughly mixed with a suitable binder material of known type, either organic or inorganic, and with the application of any necessary heat to properly distribute the binder material in the charcoal mass and/or partially cure the binder, the mixture is introduced into the open end of an aluminum holder such as member 32 having steel pins (not shown) inserted into the apertures in the flat plate thereof at its opposite end. The pins in the side apertures 32d are inserted only partially therein so as to leave a space for the filter mass to flow into so as to provide the mechanical interlock with the stepped portions 32e of holder 32, as previously mentioned. The pins placed in the central apertures 32c are inserted to the desired depth of the recesses to be formed thereby. After the rigid holder is filled with the filter mixture, the latter material is pressed into the holder cavity to compact it and ensure its flow over the stepped holder portions 32e, as well as to space the outer surface inwardly of the rim of the rigid holder. The pins in the holder apertures are then immediately removed and the bonded filter mass allowed to harden.

While in the particular embodiment illustrated only one surface of filter mass 31 is provided with recesses, it will be understood that the opposite surface may also have recesses which do not communicate with the recesses of the other surface or open on the latter surface. Such an arrangement may be used, for example, where it is desired to make the filter device (with a suitable holder therefor) reversible for exposing either of the filter surfaces to the incoming air.

It will also be understood that while the filter device has been described as used in connection with a sealed luminaire optical system, it may have application to a wide variety of other devices and apparatus where the use of such air filters is desirable or necessary.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. In a luminaire, an optical assembly comprising a housing, a reflector and light transmitting closure means secured together in sealed relation forming a closed optical enclosure, means for mounting a lamp in said enclosure, and an air-filter device arranged on said closed optical closure communicating with the interior thereof, said air-filter device comprising rigid tubular holder means having openings at opposite ends, and a mass of filter material contained in and held by said rigid holder means and having opposite surfaces through which air may pass for purification by said filter material, said mass of said filter material being formed with elongated recess means extending from one of said surfaces partially into said mass of filter material more than halfway between said opposite surfaces thereof, said elongated recess means being entirely exposed to the incoming air flow for filtering the air passing thereinto by removal of solid and gaseous impurities contained in the air, said recess means comprising a plurality of recesses having openings on said one surface of said mass of filter material, said tubular holder means of having a rigid transverse plate portion at one end covering said recessed filter surface so that said holder means forms a cup-shaped container for said filter material, said rigid plate portion having a number of apertures corresponding to the number of said recess openings, each said recess opening being in register and substantially co-extensive with one of said apertures.

2. A device as defined in claim 1, said rigid tubular holder means being formed with ledge portions in the interior thereof projecting into said mass of filter material for locking the same within said holder means.

3. A device as defined in claim 1, said housing having an outer surface formed with first connecting means and a receptacle for mounting said air-filter device, and supporting means for supporting said optical assembly having second connecting means complementary to and slidably engageable with said first connecting means and defining therewith a second enclosure enclosing said air-filter device.

* * * * *

UNITED STATES PATENT OFFICE
CERTIFICATE OF CORRECTION

Patent No. 3,695,009        Dated October 3, 1972

Inventor(s) M. M. Osteen

It is certified that error appears in the above-identified patent and that said Letters Patent are hereby corrected as shown below:

In the heading, the assignee General Electric Company should be shown.

Col. 1, line 66 - after "contained" insert - within ballast housing 1 -

Col. 4, line 2 - "32" should be - 31 -

Col. 4, line 9 - "filer" should be - filter -

Signed and sealed this 13th day of March 1973.

(SEAL)
Attest:

EDWARD M.FLETCHER,JR.              ROBERT GOTTSCHALK
Attesting Officer                  Commissioner of Patents